2,884,381
Patented Apr. 28, 1959

2,884,381
ELECTROLYTIC SOLUTION

Thomas E. Rodgers, Burbank, Calif., assignor to Northrop Aircraft, Inc., Hawthorne, Calif., a corporation of California No Drawing. Application February 21, 1955
Serial No. 489,759

2 Claims. (Cl. 252—62.2)

The present invention relates to electrolytic solutions and more particularly to solutions for use in precision measuring instruments wherein it is desirable to control certain properties of the electrolytic solution within predetermined limits.

In a class of manometric instruments for measuring acceleration, inclination, and the like, a vessel or cell containing an electrolytic solution and having two or more electrodes emerged in the solution responds to movements of the solution within the cell by variation of resistance between the electrodes; electrical means record the variations in resistivity between the electrodes due to movements of the electrolytic solution within the cell in terms of parameters functionally related to movements of the electrolytic solution. Such instruments find wide application on airborne vehicles or missiles and are customarily subjected to a wide range of operating temperatures.

An electrolytic solution having a substantially constant coefficient of resistivity with change in temperature is desirable and even critical to the satisfactory operations of manometric instruments. Some variation with change in temperature of the coefficient of conductivity or resistivity is exhibited by all electrolytic solutions and accordingly manometric instruments are subject to proportionate temperature induced error.

A common fault with known electrolytic solutions is the large temperature induced variation in coefficient of resistivity. Another common fault is instability both chemically and physically of the solutions with passage of time. Still another common fault found in known electrolytic solutions in a tendency for some components of the solution to evaporate and condense on portions of the cell above the liquid level. Such action results in erratic variations in the composition of the solution and accordingly disturbs the sensitivity of the instrument. The tendency of components in electrolytic solutions to temporarily separate within a cell is temperature induced and referred to as an "hysteresis" effect.

It is the general object of the present invention to provide an electrolytic solution for use in manometric instruments having a substantially constant coefficient of resistivity within the range of operating temperatures.

Another object of the present invention is to provide an electrolytic solution of substantially constant and low valued cofficient of resistivity within a designated temperature range.

Another object of the present invention is to provide a solvent for electrolytes having negligible tendency to separate into component parts within a wide temperature range.

An other object of the present invention is to provide an electrolytic solution for utilization in precision manometric instruments having stable chemical and electrical properties for periods of time measurable in years.

Still another object of the present invention is to provide an electrolytic solution having negligible corrosive reaction with metallic, glass, or insulating substances with which it comes into contact in utilization in a manometric instrument.

With the above and other objects in view, the invention comprises an electrolytic solution formulated from an electrolyte dissolved in a mixture of water, a substance having a low dielectric constant and a supplementary solvent for the electrolyte.

The novel electrolytic solution of the present invention satisfies the objects of the invention set forth above. An electrolyte dissolved in water exhibits increasing specific conductivity with increasing temperature due to decreasing viscosity of the solvent with increasing temperature. Many substances having low dielectric constants promote the increasing solvation or hydration of electrolytic ions with increasing temperature; greater solvation or hydration of the ions impedes their motion in the solute and accordingly reduces the specific conductivity of the solution. If an electrolyte dissolved in water is combined by means of a suitable cosolvent with a substance having a low dielectric constant, and if materials and proportions can be selected which are chemically and physically stable, then an electrolytic solution having a substantially constant coefficient of specific conductivity or specific resistivity within broad temperature ranges may be compounded.

The elctrolyte may be selected from a class of inorganic salts which are readily soluble in water in the desired concentrations within the temperature range of expected utilization, namely, minus sixty degrees to one hundred and sixty degrees Fahrenheit, and also show no tendency to chemical reaction with the solvent or components of the instrument cell. Magnesium, cadmium or lanthanum nitrates, chlorides, or sulphates have been demonstrated to be satisfactory electrolytes. However, magnesium nitrate hexahydrate $Mg(NO_3)_2 \cdot 6H_2O$ has been selected as the most satisfactory electrolyte for utilization in the present invention.

Purity of the component parts of the electrolytic solution is necessary to assure proper functioning of the solution in an instrument. The electrolyte may be dissolved in freshly distilled water having a specific resistance of over 50,000 ohms.

The solvating agent or substance of low dielectric constant may be selected from a class of organic compounds of which benzene, toluene, xylene and diethylene oxide, hereafter called dioxane, have been shown to be satisfactory. Dioxane has been selected as a preferred substance for use in the present invention.

The supplementary solvent may be selected from a broad class of organic compounds which are miscible with water and with the substance of low dielectric constant selected for a particular application. The preferred cosolvent for solutions utilizing dioxane is ethyl alcohol. Materials of sufficient purity for compounding a satisfactory electrolytic solution in accordance with the teachings of the present invention are readily obtainable by standard laboratory procedures for refinement of C.P. or U.S.P. laboratory reagents.

By means of varying the relative concentrations of the electrolyte, water, dielectric substance and supplementary solvent it is practical to compound electrolytic solutions having within limits a specified specific resistivity and a specified temperature of minimum change of specific resistivity with respect to change in temperature. This minimum temperature is hereafter referred to as the bottom temperature and symbolized by $T_b$. The specific conductivity or resistivity for a particular formulation of the novel electrolytic solution will be found most nearly constant in the temperature range near the bottom temperature, $T_b$, for that particular solution. The relative constance of the specific resistance of different formulations of the novel electrolytic solution is readily compared by consideration of the rate of change of specific resistance with respect to temperature, $\Delta R/\Delta T$, and by consideration of the second derivative, $\Delta^2 R/\Delta T^2$.

The present invention may be illustrated by the examples shown in Table I below of $Mg(NO_3) \cdot 6H_2O$, water, ethanol and dioxane systems. The parameters of the several formulations are tabulated with the specifications for the individual solutions. All of the solutions tabulated in Table I have been shown to have chemical and physical stability for periods measurable in terms of years whether stored in glass containers or held in manometric cells having electrodes and other materials immerged in the solutions.

The solutions of Table I have been prepared by dissolving a quantity of magnesium nitrate hexahydrate $$Mg(NO_3) \cdot 6H_2O$$

specified in units of moles per liter of solution in a solution consisting of a specified percent of water and the remainder a mixture of ethanol and 1,4-dioxane in the relative proportion indicated.

TABLE I

*Properties of certain $Mg(NO_3)_2$ - water - dioxane - ethanol solutions*

| Molarity Mg (NO₃)₂ | Percent Water | Percent Ethanol | Percent Dioxane | $\frac{\Delta R}{\Delta T}$ at 68° F. | $\frac{\Delta^2 R}{\Delta T^2}$ at 68° F. | $C_{70}$, Mmf. | $R_{70}$, Ohms | $R_b$, Ohms | $T_b$, ° F. |
|---|---|---|---|---|---|---|---|---|---|
| .02 | 2.0 | 40 | 60 | .24 | .0085 | 60 | 11,568 | 11,150 | 52 |
| .04 | 4.0 | 40 | 60 | .10 | .0074 | 1,600 | 2,741 | 2,722 | 85 |
| .03 | 3.0 | 40 | 60 | .05 | .0080 | 325 | 5,757 | 5,733 | 60.5 |
| .035 | 3.5 | 40 | 60 | .01 | .0070 | 565 | 4,155 | 4,155 | 70.0 |
| .035 | 3.5 | 50 | 50 | .10 | .0054 | 1,625 | 2,035 | 2,016 | 93 |
| .035 | 3.5 | 60 | 40 | .35 | .0066 | 4,700 | 1,174 | 1,076 | 120 |
| .02 | 2.5 | 40 | 60 | .20 | .0075 | Low | 10,695 | 10,400 | 50 |
| .02 | 3.0 | 40 | 60 | .10 | .0070 | 43 | 8,720 | 8,625 | 55 |
| .02 | 3.5 | 40 | 60 | .06 | .0078 | 103 | 7,075 | 7,055 | 60 |
| .02 | 4.0 | 40 | 60 | .0 | .0066 | 173 | 5,868 | 5,874 | 70 |
| .025 | 4.0 | 40 | 60 | .3 | .0064 | 265 | 4,904 | 4,903 | 72 |
| .030 | 4.0 | 40 | 60 | .4 | .0070 | 373 | 4,181 | 4,178 | 74 |
| .035 | 4.0 | 40 | 60 | .08 | .0075 | 500 | 3,618 | 3,612 | 78 |
| .04 | 4.0 | 40 | 60 | | | 500 | 3,322 | 3,315 | 78 |
| .035 | 3.5 | 40 | 60 | | | 300 | 4,318 | 4,315 | 68 |

Legend: $C_{70}$, mmf.—Specific capacity of solution at 70° F in micromicrofarads. $R_{70}$, ohms—Specific resistivity of solution at 70° F in ohms. $R_b$, ohms—Specific resistivity of solution at $T_b$ in ohms. $T_b$—Temperature of minimum resistivity of solution in ° F.

The present invention is not limited to the particular compositions described above but includes all mixtures of electrolytic solutions prepared with an electrolyte dissolved in water and mixed with a substance of low dielectric constant in proportions which yield an electrolytic solution having a substantially constant coefficient of conductivity across a broad temperature range. The present invention, moreover, is not limited by the specific examples listed above but includes obvious equivalents and is intended to be limited in scope only by the following claims.

What is claimed is:
1. An electrolytic solution having a substantially constant coefficient of conductivity with change of temperature between 63 degrees Fahrenheit and 73 degrees Fahrenheit comprising between .02 and .04 molar solution of magnesium nitrate hexahydrate dissolved in a solution consisting of between 2 and 4 percent water and the remainder a mixture of ethanol and diethylene oxide in the proportions of between 35 percent ethanol and 65 percent diethylene oxide and 50 percent ethanol and 50 percent diethylene oxide.

2. An electrolytic solution having a rate of change of coefficient of resistivity with respect to temperature of less than .10 ohm per degree Fahrenheit at 68 degrees Fahrenheit comprising .035 molar solution of magnesium nitrate hexahydrate dissolved in a solution consisting of a mixture of 4% water, and the remainder consisting of a mixture of 40% ethanol and 60% diethylene oxide.

References Cited in the file of this patent

UNITED STATES PATENTS 2,554,113    McCreary _____ May 22, 1951

FOREIGN PATENTS 637,497    Great Britain _____ May 17, 1950

OTHER REFERENCES

Schneider et al.: "The Ternary System: Dioxane-Ethanol-Water," Jour. Am. Chem. Soc., June 1943, pp. 1063–66.